Dec. 6, 1927.

G. J. BELKNAP

VALVE

Filed Feb. 17, 1927

1,651,942

INVENTOR
George J. Belknap,
BY
Geo. D. Phillips ATTORNEY.

Patented Dec. 6, 1927.

1,651,942

UNITED STATES PATENT OFFICE.

GEORGE J. BELKNAP, OF BRIDGEPORT, CONNECTICUT.

VALVE.

Application filed February 17, 1927. Serial No. 168,915.

This invention relates to an improvement in valves and particularly to a specially constructed disc holder adapted to effect a joint sufficiently tight to prevent leakage of fluids such as oils, air, steam, water, &c., when the disc is seated.

Referring to the accompanying drawings wherein the same numerals of reference indicate like parts throughout the several views.

Figure 1:
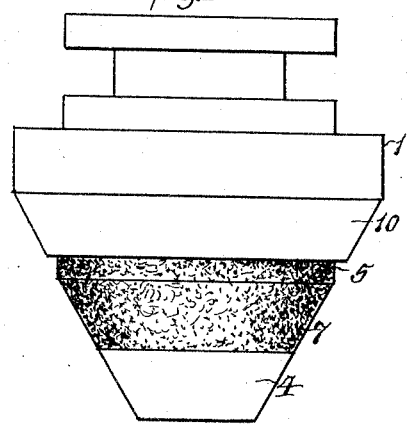
Figure 1 represents an elevation of the disc holder and disc assembled.
Figure 2:
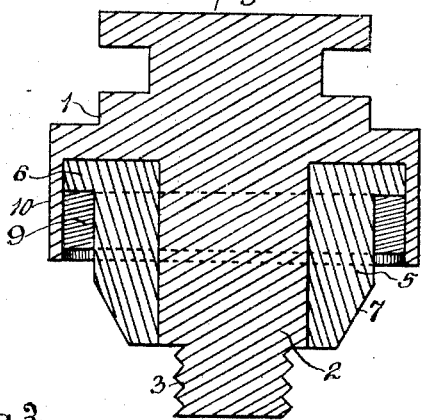
Figure 2 is a central sectional view of the disc holder, disc and sealing ring in an incomplete state of construction.
Figure 3:
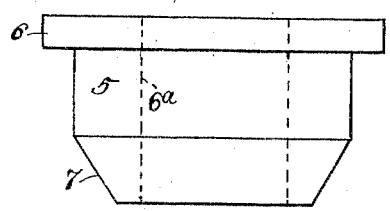
Figure 3 is an elevation of the disc.

The disc holder comprises the head 1, stem 2 with its threaded end 3 adapted to receive the nut 4. The underside of the holder is recessed to receive the disc 5 formed of non-metallic and non-porous material impregnable to fluids, gas, air, water or oils. The disc has the flange 6 adapted to be seated against the bottom of the recess, and the central opening 6ª adapted to embrace the stem 2 of the holder, Figure 2. The disc also has the taper face 7 for the valve seat 8, Figure 4.

Figure 4:
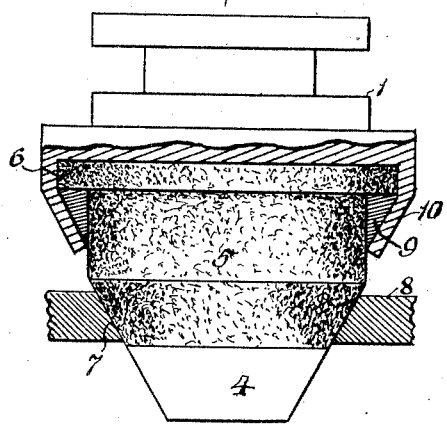
Figure 4 is a broken sectional view of the disc holder, sectional view of the sealing ring, full view of the disc and retaining nut, and broken sectional view of a valve seat.
Figure 5:
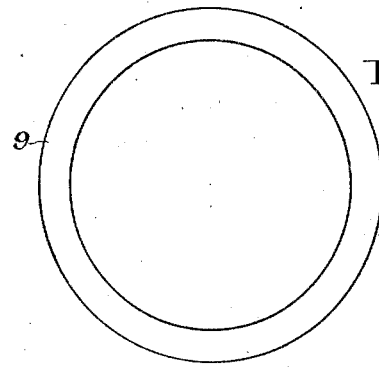
Figure 5 is a plan view of the sealing ring.

9 is a ring of lead or other soft compressible material surrounding the disc and underlying the flange 6. When the disc 5 and the ring 9 are in the position shown in Figure 2, the assembled disc is rotated and a suitable burnishing tool is applied under pressure against the skirt or outer wall 10 of the recessed holder to compress the ring 9 firmly against the body and flange of the disc as shown in Figure 4. As the burnishing force is being applied it will force out any surplus metal as fast as the skirt 10 approaches the body of the disc and leave the compact remainder to form a perfect seal within the encircling compass of the outer wall 10.

The tendency of a valve to leak fluid is when the valve is seated. As it cannot pass by a valve when properly seated it will force its way through the threaded nut and work through the several joints of the valve and escape, and the amount escaping will be in proportion to the pressure of the fluid.

The original purpose of the flange 6 and the skirt 10 was to form a joint to retain the disc 5 within the holder 1, but as this arrangement would not prevent leakage through the threaded nut, and between the stem 2 and the disc, and thence through this joint, the soft yielding metal ring 9 was inserted which forms a perfect seal against the escape of all fluids.

A valve, constructed as shown, can be made of any desired size. It is, however, specially designed for very small valves, used in oil sampling on all electrical apparatus or similar oil storage tanks.

Having thus described my invention what I claim is:—

1. A valve construction of the character described, comprising a recessed metal holder, a non-metallic and non-porous disc having a flange adapted to seat against the bottom of the recess, a ring of compressible material embracing the disc within the recess and underlying the disc flange, and pressed by the walls of the recess into tight engagement with the same.

2. A valve construction of the character described, comprising a recessed metal holder having a stem projecting therefrom, a non-metallic and non-porous disc having a central opening adapted to embrace the stem and a flange adapted to seat against the bottom of the recess, a ring of compressible material embracing the disc and within the recess and underlying the disc flange and pressed by the walls of the recess into tight engagement with the same.

In testimony whereof I affix my signature.

GEORGE J. BELKNAP.